US012354549B2

(12) United States Patent
Wang et al.

(10) Patent No.: US 12,354,549 B2
(45) Date of Patent: Jul. 8, 2025

(54) PIXEL DRIVING CIRCUIT, METHOD FOR DRIVING THE SAME, AND DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventors: Xuanyun Wang, Hubei (CN); Chao Dai, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/656,414

(22) Filed: May 6, 2024

(65) Prior Publication Data

US 2024/0290268 A1 Aug. 29, 2024

Related U.S. Application Data

(63) Continuation of application No. 17/434,768, filed as application No. PCT/CN2021/088270 on Apr. 20, 2021, now Pat. No. 12,002,423.

(30) Foreign Application Priority Data

Apr. 12, 2021 (CN) ......................... 202110387008.8

(51) Int. Cl.
*G09G 3/3233* (2016.01)
*G09G 3/32* (2016.01)
(Continued)

(52) U.S. Cl.
CPC ............. *G09G 3/3233* (2013.01); *G09G 3/32* (2013.01); *G09G 3/3266* (2013.01);
(Continued)

(58) Field of Classification Search
CPC ...... G09G 3/32; G09G 3/3266; G09G 3/3291; G09G 3/3233
See application file for complete search history.

(56) References Cited

U.S. PATENT DOCUMENTS

| | | | | |
|---|---|---|---|---|
| 10,490,128 | B1 * | 11/2019 | Qian .................... | G09G 3/3266 |
| 2012/0038683 | A1 * | 2/2012 | Park .................... | G09G 3/3233 345/77 |

(Continued)

FOREIGN PATENT DOCUMENTS

| | | | |
|---|---|---|---|
| CN | 104575367 | A | 4/2015 |
| CN | 107564468 | A | 1/2018 |

(Continued)

OTHER PUBLICATIONS

Chinese Office Action issued in corresponding Chinese Patent Application No. 202110387008.8 dated Jan. 17, 2022, pp. 1-12.

(Continued)

*Primary Examiner* — Matthew A Eason
*Assistant Examiner* — Scott D Au
(74) *Attorney, Agent, or Firm* — PV IP PC; Wei Te Chung

(57) ABSTRACT

A pixel driving circuit, a driving method thereof, and a display panel are proposed. The pixel driving circuit includes a switching transistor connected between a gate of the driving transistor and the initialization voltage node and between the first electrode of the driving transistor. The active layer of the switching transistor includes an oxide semiconductor with a characteristics of low leakage current.

(Continued)

The display quality is improved when the display panel is operated in the low-frequency driving mode for display.

18 Claims, 15 Drawing Sheets

(51) Int. Cl.
*G09G 3/3266* (2016.01)
*G09G 3/3291* (2016.01)

(52) U.S. Cl.
CPC ... *G09G 3/3291* (2013.01); *G09G 2300/0842* (2013.01); *G09G 2310/0216* (2013.01); *G09G 2310/0278* (2013.01); *G09G 2320/0247* (2013.01); *G09G 2330/021* (2013.01)

(56) References Cited

U.S. PATENT DOCUMENTS

| | | | | |
|---|---|---|---|---|
| 2016/0322446 | A1 | 11/2016 | Park | |
| 2021/0035505 | A1 | 2/2021 | Kwon et al. | |
| 2022/0114958 | A1* | 4/2022 | Feng | H10D 10/821 |

FOREIGN PATENT DOCUMENTS

| | | | |
|---|---|---|---|
| CN | 107610651 | A | 1/2018 |
| CN | 109545150 | A | 3/2019 |
| CN | 109979394 | A | 7/2019 |
| CN | 110942743 | A | 3/2020 |
| CN | 111724745 | A | 9/2020 |
| CN | 111754920 | A | 10/2020 |
| CN | 112086052 | A | 12/2020 |
| CN | 112397030 | A | 2/2021 |
| CN | 112562588 | A | 3/2021 |
| CN | 212724668 | U | 3/2021 |
| KR | 20210027577 | A | 3/2021 |

OTHER PUBLICATIONS

International Search Report in International application No. PCT/CN2021/088270, mailed on Jan. 18, 2022.
Written Opinion of the International Search Authority in International application No. PCT/CN2021/088270, mailed on Jan. 18, 2022.

* cited by examiner

PIXEL DRIVING CIRCUIT, METHOD FOR DRIVING THE SAME, AND DISPLAY PANEL

CROSS-REFERENCE TO RELATED APPLICATIONS

This application is a continuation application of U.S. application Ser. No. 17/434,768, filed on Aug. 30, 2021, which is a National Phase of PCT Patent Application No. PCT/CN2021/088270 having international filling date of Apr. 20, 2021, which claims the priority of Chinese Application No. 202110387008.8 filed with the Chinese Patent Office on Apr. 12, 2021 and titled "Pixel Driving Circuit, Method for Driving the Same, and Display Panel", which is incorporated herein by reference in its entirety.

FIELD OF THE DISCLOSURE

The present disclosure relates to a technical field of display panel, more particularly, to a pixel driving circuit, a method for driving a pixel and a display panel.

BACKGROUND

When the pixel driving circuit drives the light-emitting element to emit light, the change in the potential applied on a gate of the driving transistor in the pixel driving circuit may easily cause the light-emitting element to emit light unstable. In particular, when the display panel adopts a low-frequency driving mode for display, flickering phenomenon occurs, which affects the display quality of the display panel.

SUMMARY

Technical Problem

Embodiments of the present disclosure propose pixel driving circuits, a method for driving a pixel and a display panel, which can improve the problem of flickering when the display panel adopts a low-frequency driving mode for display.

Technical Solution

The present disclosure provides a pixel driving circuit comprising a light-emitting element, a driving transistor connected to the light-emitting element in series, a data transistor connected between the driving transistor and a data voltage node, a switching transistor, and a light controlling transistor. The switching transistor is connected between a gate of the driving transistor and an initialization voltage node, and is connected to a source or a drain of the driving transistor, wherein an active layer of the switching transistor comprises an oxide semiconductor. The light controlling transistor is connected to the driving transistor in series. A gate of the switching transistor and a gate of the light controlling transistor are connected to a light controlling line.

The present disclosure also provides a method of driving the pixel driving circuit as disclosed above. The method includes: conducting initialization signal from the initialization voltage node to the gate of the driving transistor by the switching transistor, conducting data signal from the data voltage node to the gate of the driving transistor by the data transistor and the switching transistor, and driving the light-emitting element to emit light by the driving transistor under control of the light controlling transistor.

The present disclosure also provides a display panel comprising a plurality of pixel driving circuits, a plurality of light-emitting elements, a plurality of gate driving circuits, and a plurality of light signal controlling circuits. Each of the pixel driving circuit comprises a driving transistor and a switching transistor that comprises an active layer made of an oxide semiconductor. Each of the light-emitting elements driven by one of the pixel driving circuits to emit light. The plurality of gate driving circuits are configured to supply scanning signals to the plurality of pixel driving circuits through the scanning lines. The plurality of light signal controlling circuits are coupled to the pixel driving circuits through light controlling signal lines and configured to generate light controlling signals. The voltage applied on the gate of the driving transistor is reset in response to the light controlling signal by the switching transistor, and threshold voltage of the driving transistor is compensated by the data signal by the switching transistor.

The present disclosure also provides a display device comprising the pixel driving circuit and the display panel.

Advantageous Effect

In contrast to prior art, the present disclosure provides a pixel driving circuit comprising a light-emitting element, a driving transistor connected to the light-emitting element in series, a data transistor connected between the driving transistor and a data voltage node, a switching transistor, and a light controlling transistor. The switching transistor is connected between a gate of the driving transistor and an initialization voltage node, and is connected to a source or a drain of the driving transistor, wherein an active layer of the switching transistor comprises an oxide semiconductor. The light controlling transistor is connected to the driving transistor in series. A gate of the switching transistor and a gate of the light controlling transistor are connected to a light controlling line. The low leakage current characteristic of the switching transistor improves the uneven light emission of the light-emitting element caused by the unstable gate voltage of the driving transistor, which is beneficial to improve the problem of flicker that is likely to occur when the display panel adopts a low-frequency driving mode for display, improving the display quality of the display panel.

DESCRIPTION OF THE EMBODIMENTS

Figure 1A:
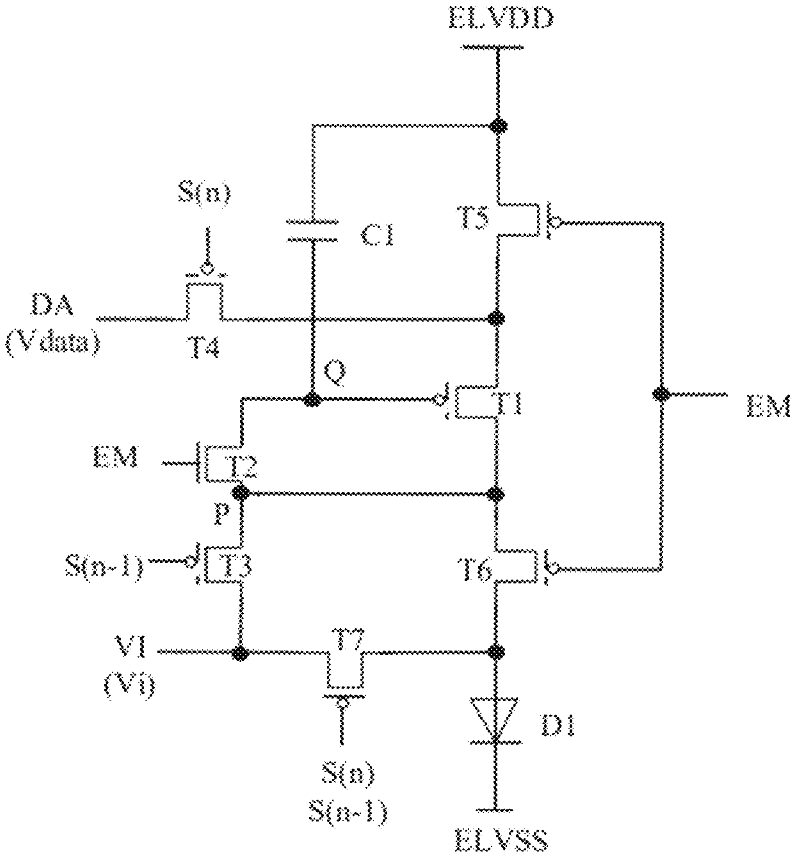
FIG. 1A-1D illustrate circuit diagrams of pixel driving circuits according to embodiments of the present disclosure.

The invention is described below in detail with reference to the accompanying drawings, wherein like reference numerals are used to identify like elements illustrated in one or more of the figures thereof, and in which exemplary embodiments of the invention are shown.

Please refer to FIG. 1A-1D illustrating circuit diagrams of pixel driving circuits according to embodiments of the present disclosure. FIG. 2 is a timing diagram of the pixel driving circuits according to embodiments of the present disclosure.

The pixel driving circuit includes a light-emitting element D1, a driving transistor T1, a switching transistor T2, a light controlling transistor and a data transistor T4.

Optionally, the light-emitting element D1 may be organic light-emitting diodes, sub-millimeter light-emitting diodes or miniature light-emitting diodes.

The driving transistor T1 is connected between a first voltage end ELVDD and the light-emitting element D1, and is used for driving the light-emitting element D1 to emit light.

The switching transistor T2 is connected between a gate of the driving transistor T1 and an initialization voltage node VI, and connected to a source or a drain of the driving transistor T1. The switching transistor T2 conducts, in response to a first light-emitting control signal Em1, the initialization signal Vi or data signal Vdata to a gate of the driving transistor T1, so that a gate voltage or a threshold voltage of the switching transistor T1 are initialized.

An active layer of the switching transistor T2 comprises an oxide semiconductor. Due to low current leakage characteristics of the switching transistor T2, the gate voltage of the driving transistor T1 is stabilized, so that when the light-emitting element D1 is driven by the driving transistor T1 to emit light, the light-emitting element D1 can not emit uneven light caused by unstable gate voltage of the driving transistor T1. Therefore, the flicker phenomenon can be improved, which is beneficial to reduce power consumption and improve luminescence stability of the light-emitting element D1.

Optionally, the oxide semiconductor includes a metal oxide semiconductor such as indium gallium zinc oxide, zinc oxide, tin oxide, indium oxide, and the like.

The data transistor T4 is connected between the driving transistor T1 and the data voltage node DA. In response to a second scanning signal Scan(n) applied on the second scanning signal S(n), the data transistor T4 is used for conducting the data signal Vdata to a gate of the driving transistor T2 via the switching transistor T2.

The gate of the data transistor T4 is applied with the second scan signal line S(n), the first electrode of the data transistor T4 is connected to the data voltage node DA, and the second electrode of the data transistor T4 is connected to the first electrode of the driving transistor T1. The two electrodes are connected to the first electrode of the driving transistor T1.

The light controlling transistor is connected in series with the driving transistor T1. The gate of the switching transistor T2 and the gate of the light controlling transistor are both connected to the light controlling signal line EM to reduce the number of control signal lines, thereby saving wiring space.

Optionally, the light controlling signal line EM that is connected to the gate of the switching transistor T2 loads a first light controlling signal Em1, and the light controlling signal line EM that is connected to the gate of the light controlling transistor loads a second light controlling signal Em2. The timings of the first light controlling signal Em1 and the second light controlling signal Em2 may be the same or different. Further, the timings of the first light controlling signal Em1 and the second light controlling signal Em2 are different. The second light controlling signal Em2 includes a time period for implementing the black insertion technology.

Further, the light controlling transistor includes a first light controlling transistor T5 and a second light controlling transistor T6. The first light controlling transistor T5 is connected between the driving transistor T1 and the first voltage node ELVDD. The second light controlling transistor T6 is connected between the driving transistor T1 and the second voltage node ELVSS. The gate of the first light controlling transistor T5 and the gate of the second light controlling transistor T6 are both connected to the light controlling signal line EM.

The first electrode of the first light controlling transistor T5 is connected to the first voltage node ELVDD, and the second electrode of the first light controlling transistor T5 is connected to the first electrode of the driving transistor T1. The first electrode of the second light emitting control transistor T6 is connected to the second electrode of the driving transistor T1, and the second electrode of the second light emitting control transistor T6 is connected to the anode of the light-emitting element D1.

Further, in a case that the timings of the first light controlling signal Em1 and the second light controlling signal Em2 are the same, the first light controlling transistor T5, the second light controlling transistor T6, and the switching transistor T2 are all connected to the same light controlling signal line EM, so that the first light controlling transistor T5, the second light controlling transistor T6, and the switching transistor T2 can be used to control the light emission state of the light-emitting element D1, to initialize voltage applied on the gate of the driving transistor T1, and to compensate the threshold voltage of the driving transistor T1. In addition, in order to avoid mutual interference of the first light controlling transistor T5, the second light controlling transistor T6, and the switching transistor T2 during operation, the first light controlling transistor T5 and the second light controlling transistor T6 are different from the switching transistor T2. For instance, the switching transistor T2 is an N-type transistor, and the first light controlling transistor T5 and the second light controlling transistor T6 are P-type transistors.

Please refer to FIGS. 1A to 1D, the pixel driving circuit also includes an initialization transistor T3 connected between the switching transistor T2 and the initialization voltage node VI. The initialization transistor T3 is configured to, in response to the first scan signal Scan (n−1), transmit the initialization signal Vi to the first electrode of the driving transistor T1, and transmit the initialization signal Vi to the gate of the driving transistor T1 through the switching transistor T2.

The gate of the initialization transistor T3 is connected to the first scan signal line S(n−1), the first electrode of the initialization transistor T3 is connected to the initialization voltage node VI, and the second electrode of the initialization transistor T3 is connected to the first electrode of the switching transistor T2 and the first electrode of the driving transistor T1.

Optionally, the active layer of the switching transistor T2 and the active layer of the initialization transistor T3 are made of the same or different semiconductor materials.

In a case that the active layer of the switching transistor T2 and the active layer of the initialization transistor T3 are made of the same semiconductor material, the switching transistor T2 and the initialization transistor T3 of the pixel driving circuit can be used to improve uneven light emission of the light-emitting element D1 arisen from unstable gate voltage of the driving transistor T1, thereby improving the flicker phenomenon.

In a case that the active layer of the switching transistor T2 and the active layer of the initialization transistor T3 are made of different semiconductor materials, the initialization transistor T3 of the pixel driving circuit can be used to improve uneven light emission of the light-emitting element D1 arisen from unstable gate voltage of the driving transistor T1, thereby improving the flicker phenomenon. Optionally, the silicon semiconductor includes monocrystalline silicon, polycrystalline silicon, and the like. Further, the polysilicon includes low temperature polysilicon.

Further, because of the active layer of the initialization transistor T3 made of the silicon semiconductor, the leakage current of the initialization transistor T3 is greater than the leakage current of the switching transistor T2. The initialization signal Vi can be dynamically variable. When the light-emitting element D1 emits light, the initialization signal Vi is transmitted to the first electrode of the driving transistor T1 through the initialization transistor T3, so that, due to the leakage current characteristic of the initialization transistor T3, an impact of the first electrode of the driving transistor T1 on the gate voltage of the driving transistor T1 is reduced to stabilize the light-emitting of the light-emitting element D1.

When the switching transistor T2 and the initialization transistor T3 are turned on at the same time, or the switching transistor T2 and the data transistor T4 are turned on at the same time, the initialization signal Vi applied on the initialization voltage node VI is a constant signal. When the driving transistor T1 drives the light-emitting element D1 to emit light, the initialization signal Vi is a continuous rising signal or a continuous falling signal.

Please refer to FIGS. 1A to 1D. The pixel driving circuit further includes a reset transistor T7 connected between the initialization voltage node VI and the light-emitting element D1. The reset transistor T7 is used for transmitting, in response to the first signal Scan(n−1) or the second scan signal Scan(n), the initialization signal Vi to the anode of the light-emitting element D1 to initialize the voltage applied on the anode of the light-emitting element D1.

Optionally, the reset transistor T7 may be directly connected to the initialization voltage node VI, or may be indirectly connected to the initialization voltage node VI.

Figure 2:
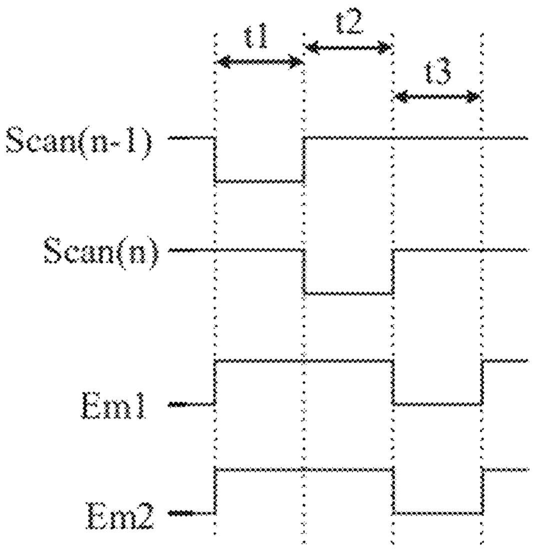
FIG. 2 is a timing diagram of the pixel driving circuits according to embodiments of the present disclosure.

Referring to FIG. 1A, the gate of the reset transistor T7 is connected to the first scan signal line S(n−1) or the second scan signal line S(n). The first electrode of the reset transistor T7 is connected to the anode of the light-emitting element D1. The second electrode of the reset transistor T7 is connected to the initialization voltage node VI. The initialization signal Vi is transmitted to the anode of the light-emitting element D1 through the reset transistor T7.

Figure 1B:
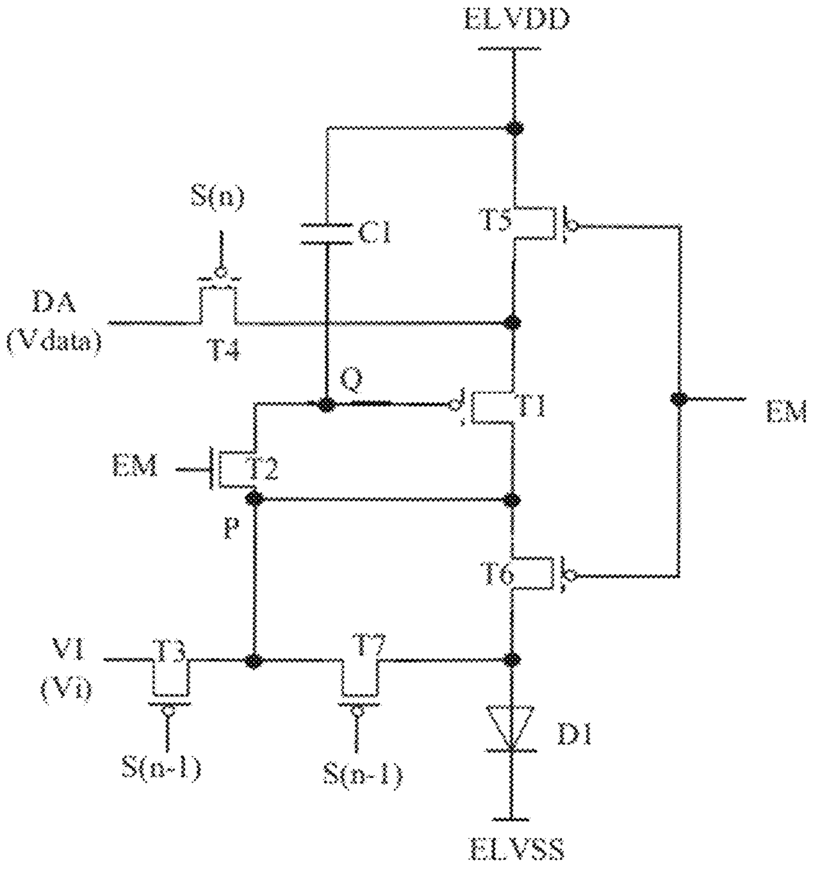

Referring to FIG. 1B, since one of the source or drain of the initialization transistor T3 is connected to the initialization voltage node VI, the reset transistor T7 may also be connected between the initialization transistor T3 and the anode of the light-emitting element D1, so that the first electrode of the reset transistor T7 is indirectly fed with the initialization signal Vi. Therefore, the gate of the reset transistor T7 is connected to the first scan signal line S(n−1). The first electrode of the reset transistor T7 is connected to the anode of the light-emitting element D1.

The second electrode of the reset transistor T7 is connected to the first electrode of the initialization transistor T3, the first electrode of the switching transistor T2, and the first electrode of the driving transistor T1. The initialization signal Vi is transmitted through the initialization transistor T3 to the first electrode of the reset transistor T7, the first electrode of the switching transistor T2, and the first electrode of the driving transistor T1 to initialize voltage applied on the anode of the light-emitting element D1. The initialization of the gate voltage of the driving transistor T1 is realized by the initialization transistor T3 and the switching transistor T2. Initializing the transistor T3 reduces an impact of voltage of the first electrode of the driving transistor T1 on the gate voltage of the driving transistor T1.

Optionally, the active layer of the reset transistor T7 is made of an oxide semiconductor or a silicon semiconductor. Further, the active layer of the reset transistor T7 is made of a silicon semiconductor. When the pixel driving circuit utilizes the dynamically variable initialization signal Vi, the light-emitting element D1 can emit light evenly because the leakage current characteristic of the reset transistor T7 dynamically compensates voltage applied on the anode voltage of the device D1.

Figure 1C:
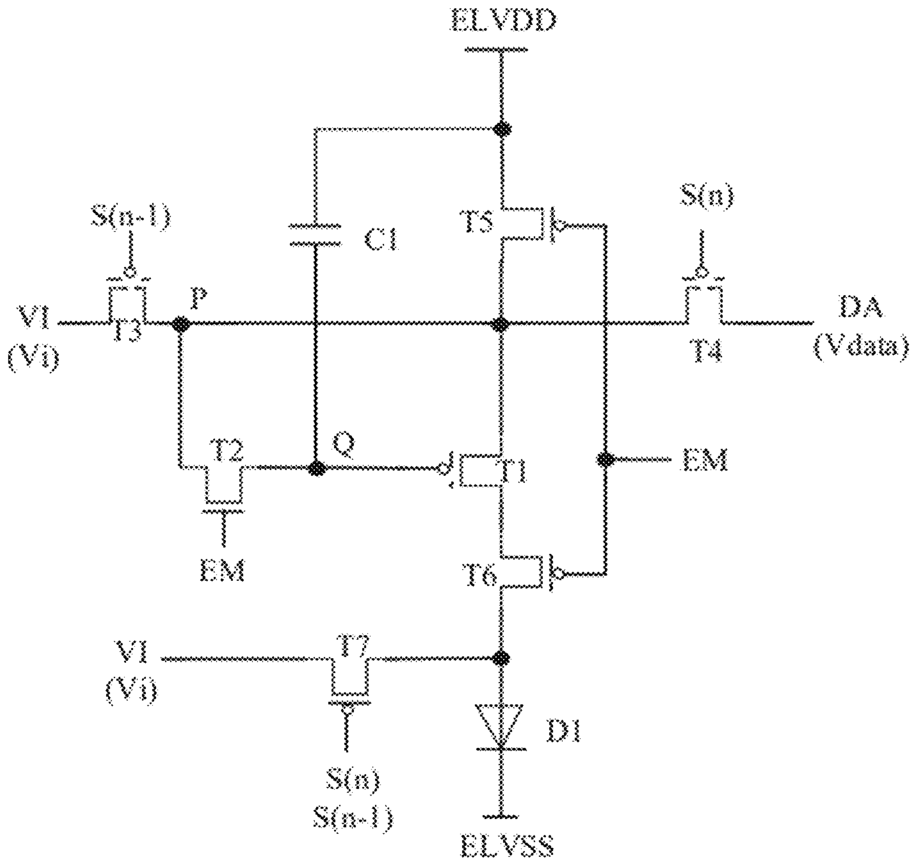
Figure 1D:
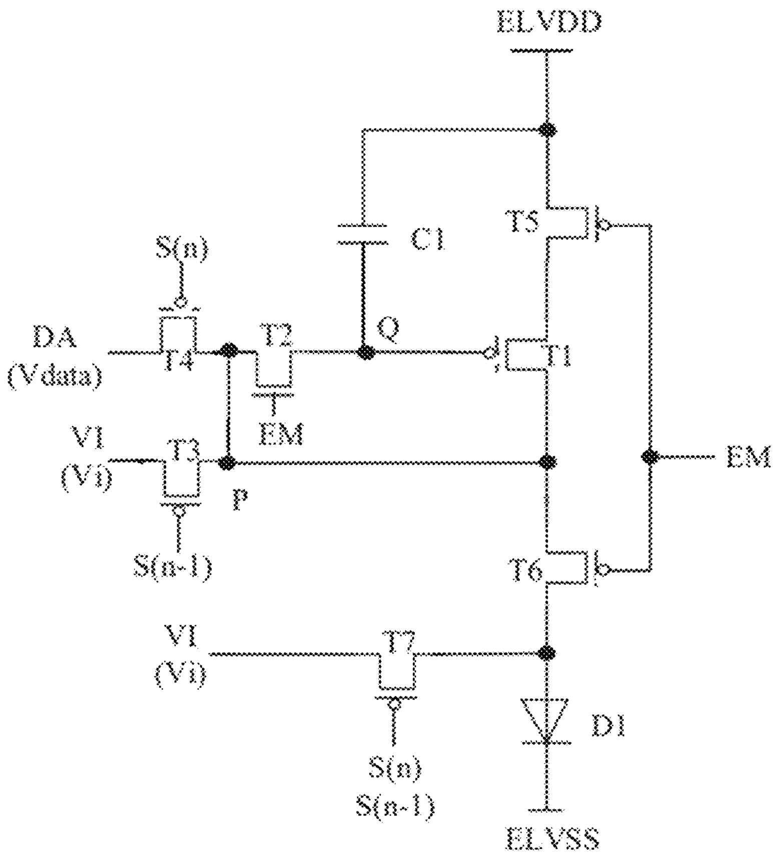

Optionally, according to the pixel driving circuit illustrated in FIGS. 1C to 1D, the reset transistor T7 may also be indirectly connected to the initialization voltage node VI through the initialization transistor T3. The gate of the reset transistor T7 is connected to the first scan signal line S(n−1).

Please refer to FIGS. 1A to 1D. The pixel driving circuit further includes a storage capacitor C1 connected between the gate of the driving transistor Td and the first voltage node ELVDD. The storage capacitor C1 is used to hold the gate voltage of the driving transistor T1. The cathode of the light-emitting element D1 is connected to the second voltage node ELVSS.

Optionally, the driving transistor T1, the reset transistor T7, and the data transistor T4 are P-type transistors or N-type transistors.

Please continue to refer to FIGS. 1A to 1D and FIG. 2. An embodiment of the present application also provides a driving method of a pixel driving circuit for driving any of the above-mentioned pixel driving circuits. In the Nth frame period, the driving methods include:

In the initialization phase t1, s used to load the initialization signal Vi applied on the initialization voltage node VI is conducted to the gate of the driving transistor T1 via the switching transistor T2 to initialize the gate voltage of the driving transistor T1.

In the data writing and threshold voltage compensation phase t2, the data signal Vdata applied on the data voltage node DA is loaded to the gate of the driving transistor T1 by the data transistor T4 and the switching transistor T2 to compensate the threshold voltage of the driving transistor T1.

In the light-emitting stage t3, the light controlling transistor is used to control the driving transistor T1 driving the light-emitting element D1 to emit light.

Figure 3A:
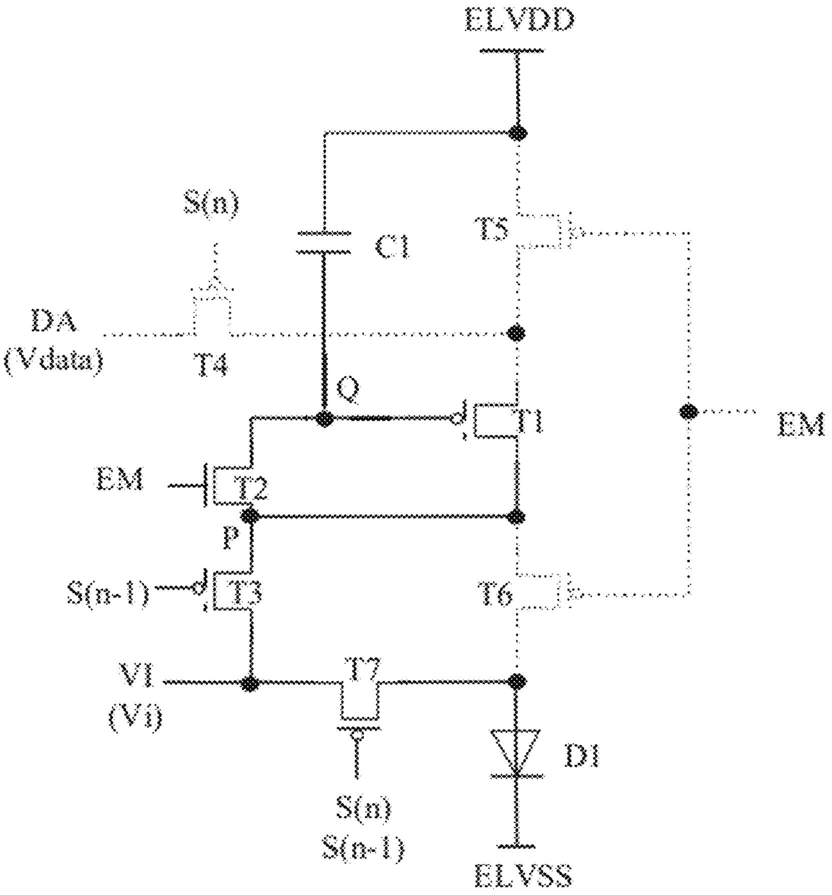
FIG. 3A-FIG. 3C depict operations of the pixel driving circuit as illustrated in FIG. 1A.
Figure 3B:
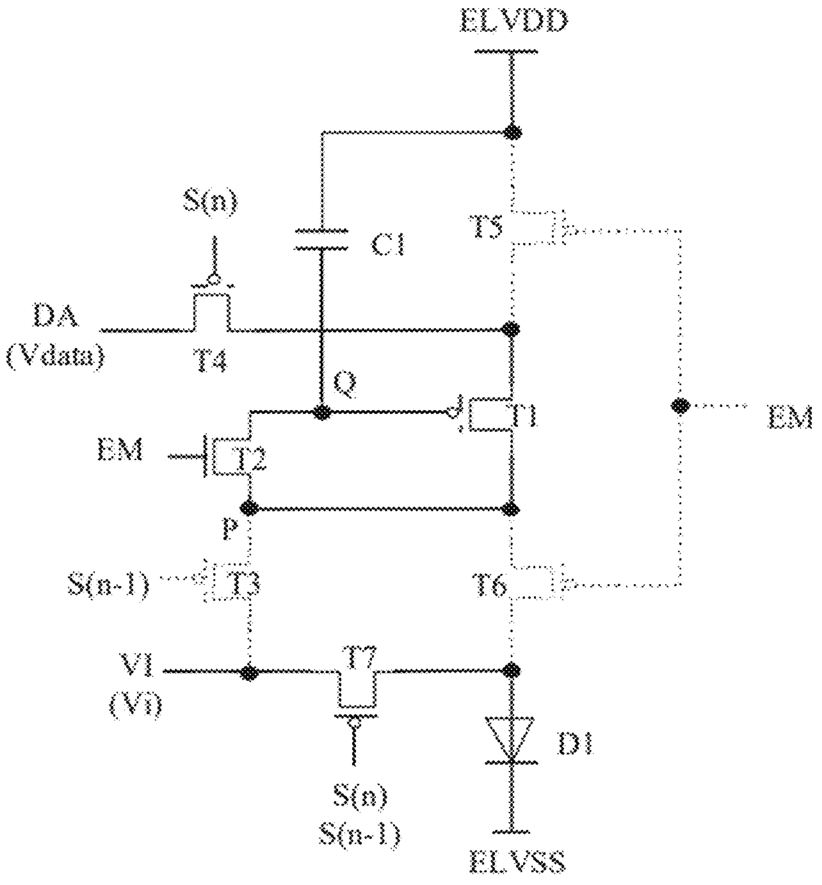
Figure 3C:
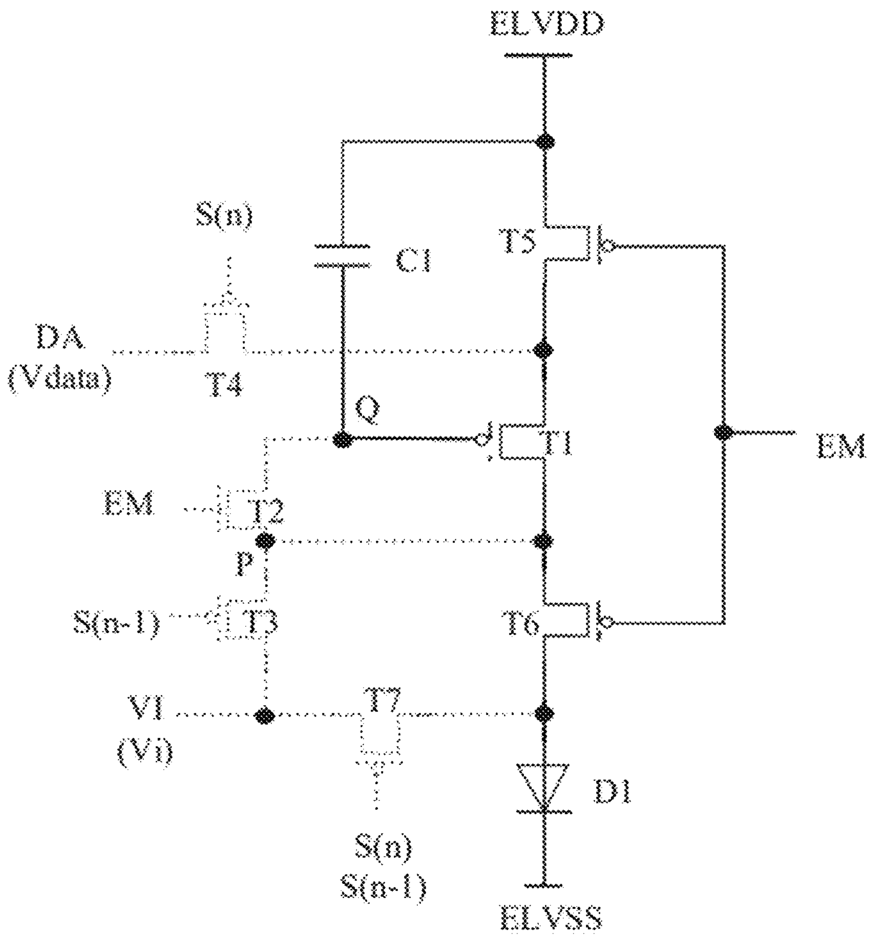
Figure 3D:
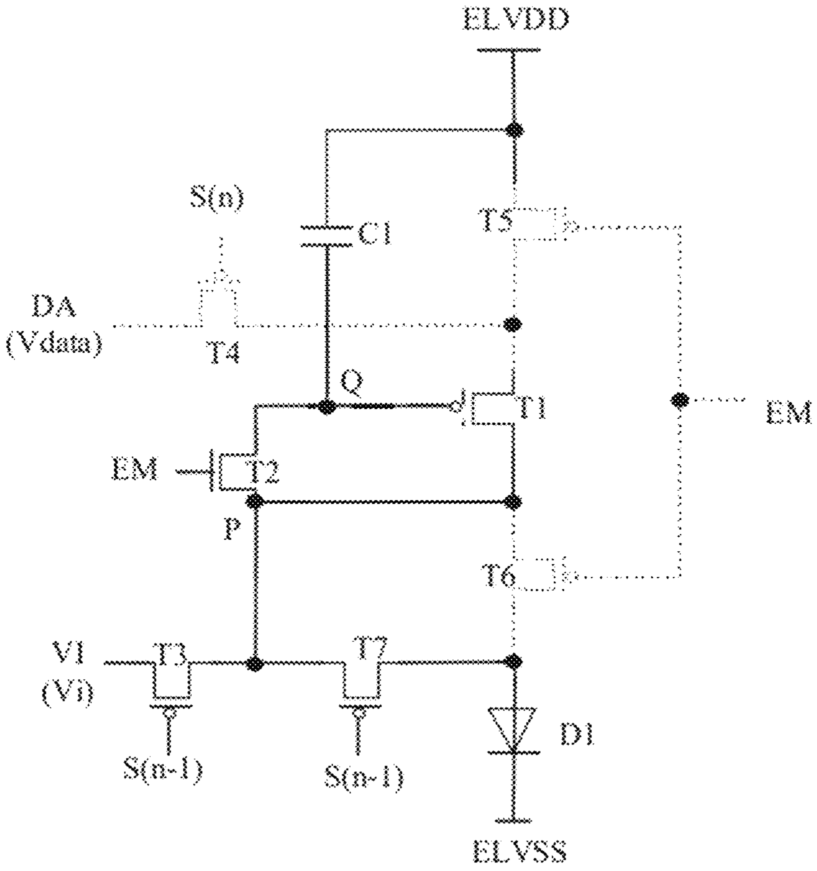
FIG. 3D-FIG. 3F depict operations of the pixel driving circuit as illustrated in FIG. 1B.
Figure 3E:
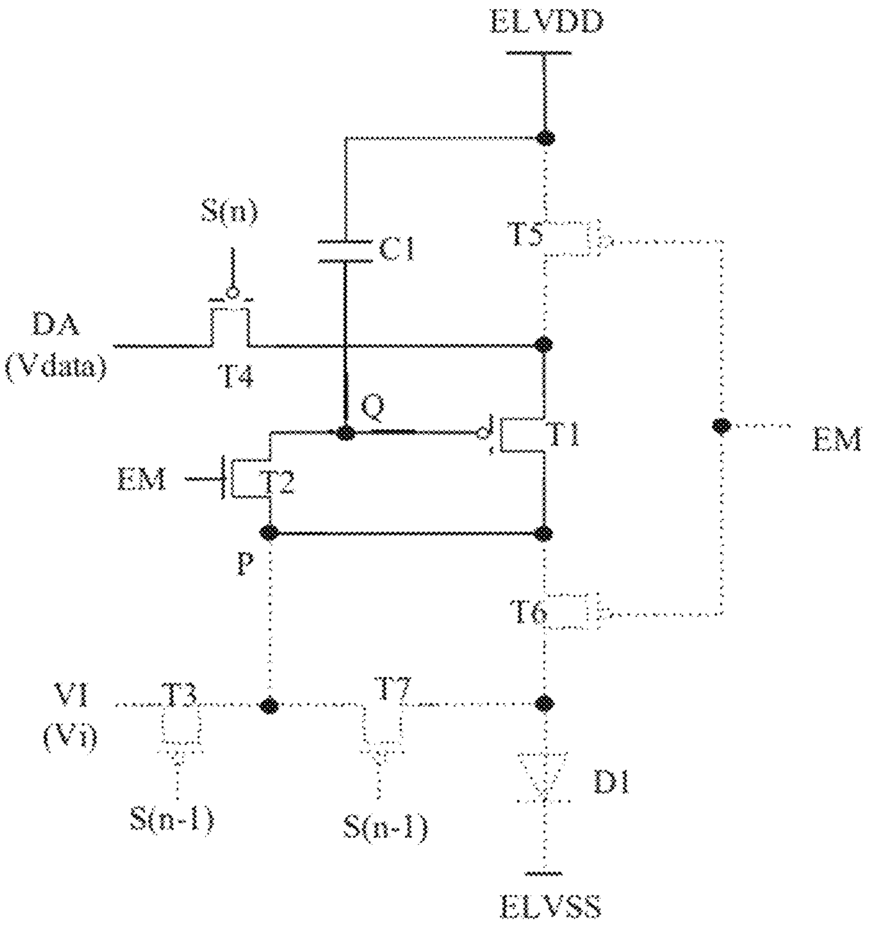
Figure 3F:
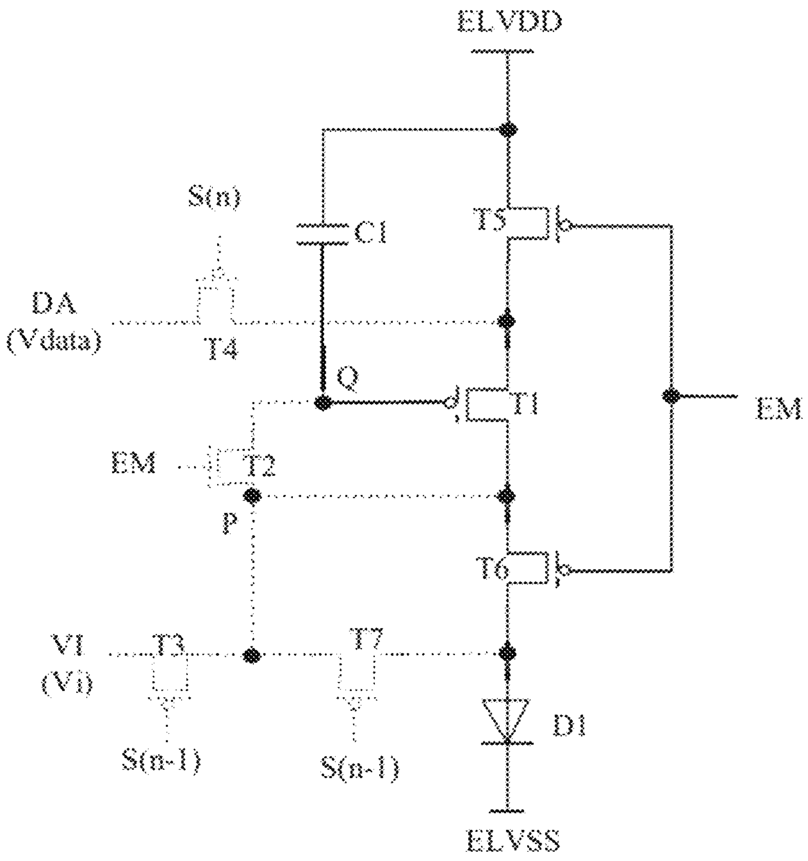

Take the pixel driving circuit shown in FIGS. 1A to 1B as an example to introduce the working principle of the pixel driving circuit. The working principle of the pixel driving circuit shown in FIGS. 1C to 1D is similar to that shown in FIGS. 1A to 1B and will not be repeated. FIGS. 3A to 3C illustrate operations of the pixel driving circuit shown in FIG. 1A. FIGS. 3D to 3F illustrate operations of the pixel driving circuit shown in FIG. 1B. The initialization transistor T3, the reset transistor T7, the first light controlling transistor T5, the second light controlling transistor T6, and the data transistor T4 are P-type silicon transistors. The switching transistor T2 is an N-type oxide transistor.

In the initialization phase t1, the first scan signal Scan(n−1) is at a low voltage level, while the first light controlling signal Em1, the second light controlling signal Em2, and the second scan signal Scan(n) are at high voltage level. The switching transistor T2 and the initialization transistor T3 are turned on in response to the first light controlling signal Em1 and the first scan signal Scan(n−1), respectively. The first light controlling transistor T5, the second light controlling transistor T6, and the data transistor T4 are turned off. As illustrated in FIG. 3A and FIG. 3D, the initialization signal Vi is transmitted to the first electrode of the driving transistor T1 (that is, node P). The initialization signal Vi is also transmitted to the gate of the driving transistor T1 (that is, node Q) through the switching transistor T2, so as to initialize the gate voltage of the driving transistor T1. In the pixel driving circuit shown in FIG. 1B, the reset transistor T7 is also turned on in response to the first scan signal Scan(n−1), as shown in FIG. 3D. The initialization signal Vi is transmitted to the anode of the light-emitting element D1 to initialize voltage applied on the anode of the light-emitting element D1.

In the data writing and threshold voltage compensation phase t2, the first scan signal Scan(n−1), the first light controlling signal Em1, and the second light controlling signal Em2 are at high voltage level, while the second scan signal Scan(n) is at low voltage level. The switching transistor T2 is turned on in response to the first light controlling signal Em1, and the data transistor T4 is turned on in response to the second scan signal Scan(n). The initialization transistor T3, the first light controlling transistor T5, and the second light controlling transistor T6 are turned off. The data signal Vdata is transmitted to the gate of the driving transistor T1 through the data transistor T4 and the switching transistor T2, so that the threshold voltage of the driving transistor T1 is compensated, as shown in FIG. 3B and FIG. 3E. In the pixel driving circuit shown in FIG. 1A, if the reset transistor T7 is turned on in response to the first scan signal Scan(n), the initialization signal Vi is transmitted to the anode of the light-emitting element D1 to initialize voltage applied on the anode of the light-emitting element D1 during the data writing and threshold voltage compensation phase t2.

In the light-emitting stage t3, the first scan signal Scan (n−1) and the second scan signal Scan(n) are at high voltage level, while the first light controlling signal Em1 and the second light controlling signal Em2 are at low voltage level. The first light controlling transistor Te1 and the second light controlling transistor Te2 are turned on in response to the second light controlling signal Em2. The initialization transistor T3, reset transistor T7, data transistor T4 and switching transistor T2 are turned off. The driving transistor Td generates a driving current for driving the light-emitting element D1 to emit light, and the storage capacitor Cst maintains the gate voltage of the driving transistor Td to make the light-emitting element D1 continuously emit light, as shown in FIG. 3C and FIG. 3F.

Optionally, the initialization signal Vi may be a constant signal or a dynamically variable signal. Specifically, in a case that the initialization signal Vi is a dynamically variable signal, the initialization signal Vi is a constant signal during the initialization phase t1 and the data writing and threshold voltage compensation phase t2. During the light-emitting phase t3, the initialization signal Vi continuously rises with the decrease of the gate voltage of the driving transistor Td, or continuously drops with the increase of the gate voltage of the driving transistor Td, so as to dynamically compensate the gate voltage of the driving transistor Td during the light-emitting period t3.

Figure 4:
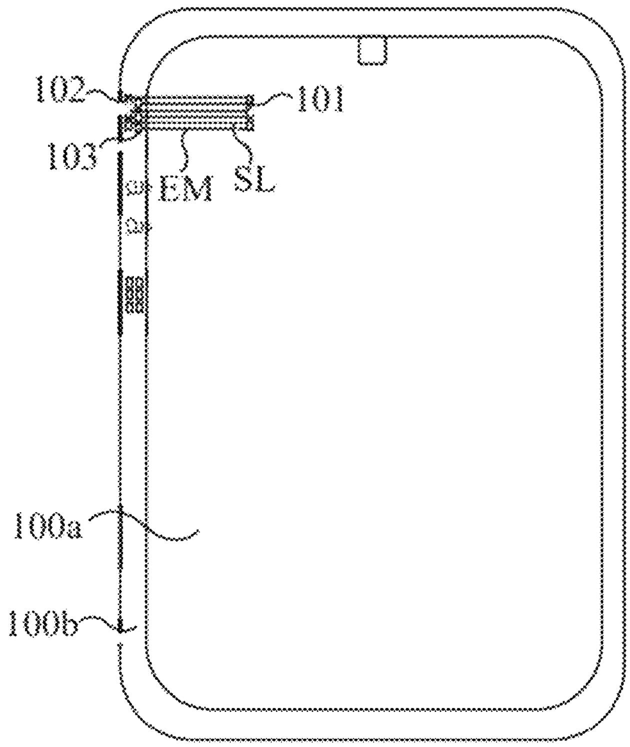
FIG. 4 illustrate a schematic diagram of a display panel circuit diagrams according to an embodiment of the present disclosure.
Figure 5A:
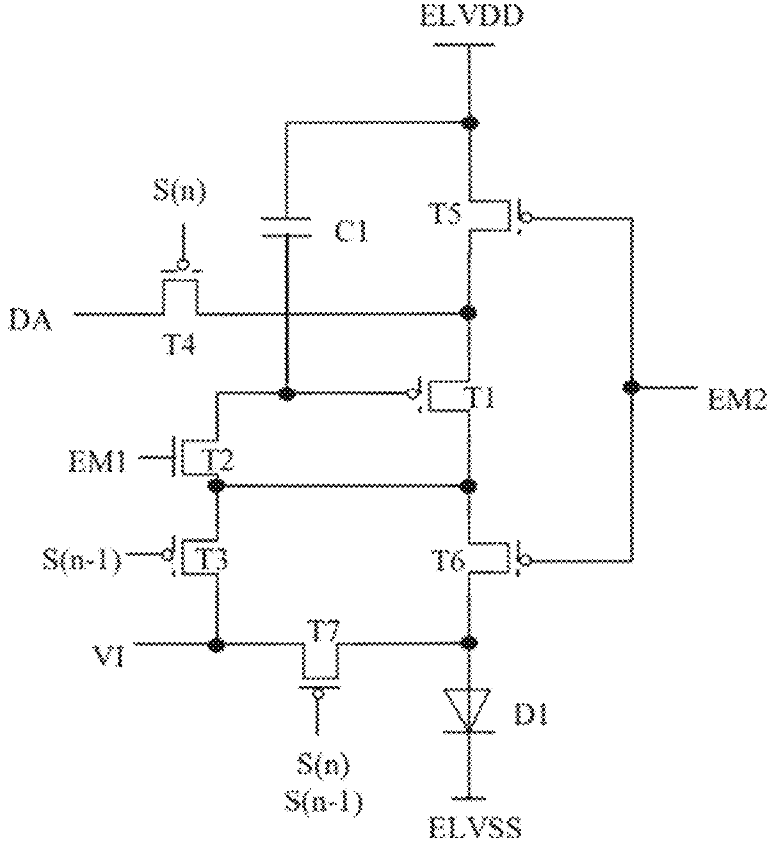
FIG. 5A-5D illustrate circuit diagrams of pixel driving circuits according to embodiments of the present disclosure.
Figure 5B:
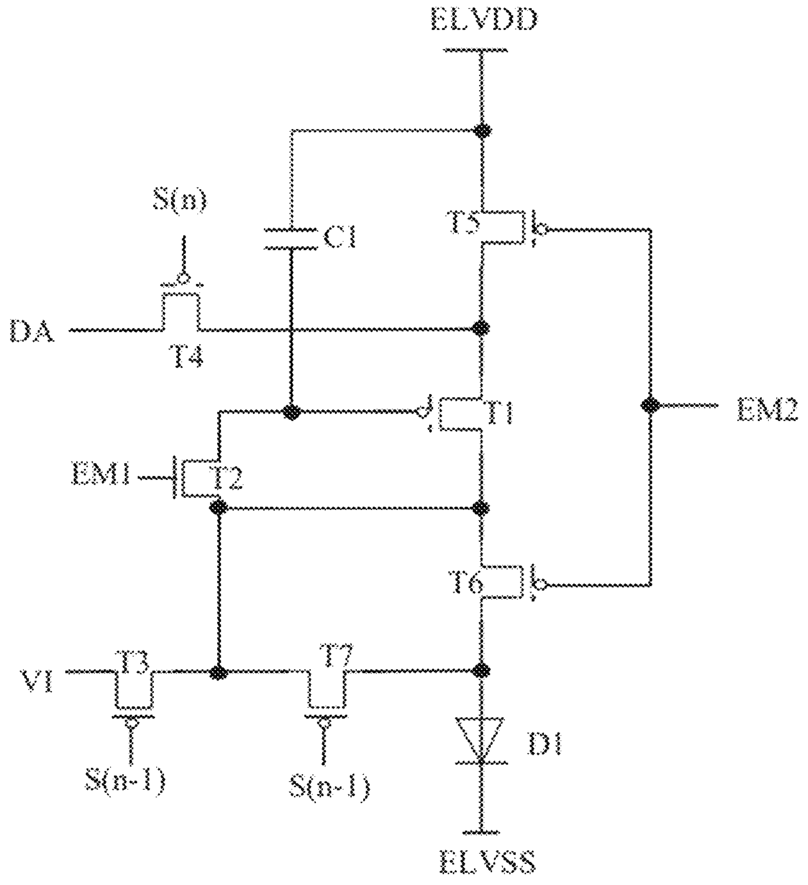
Figure 5C:
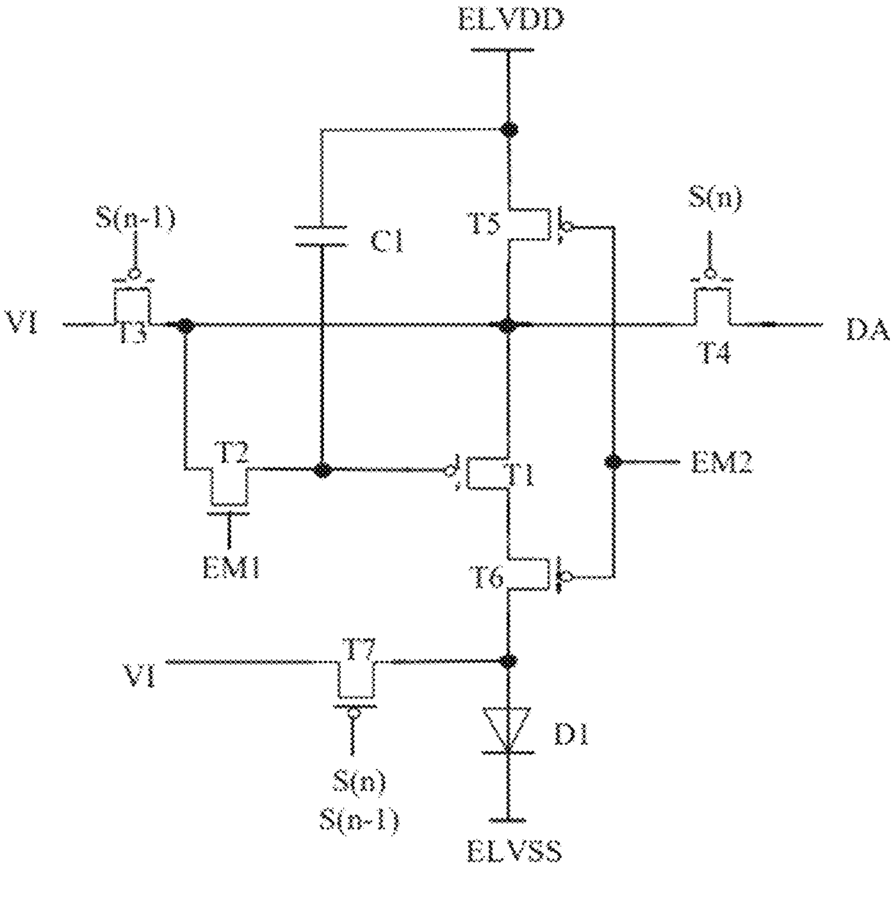
Figure 5D:
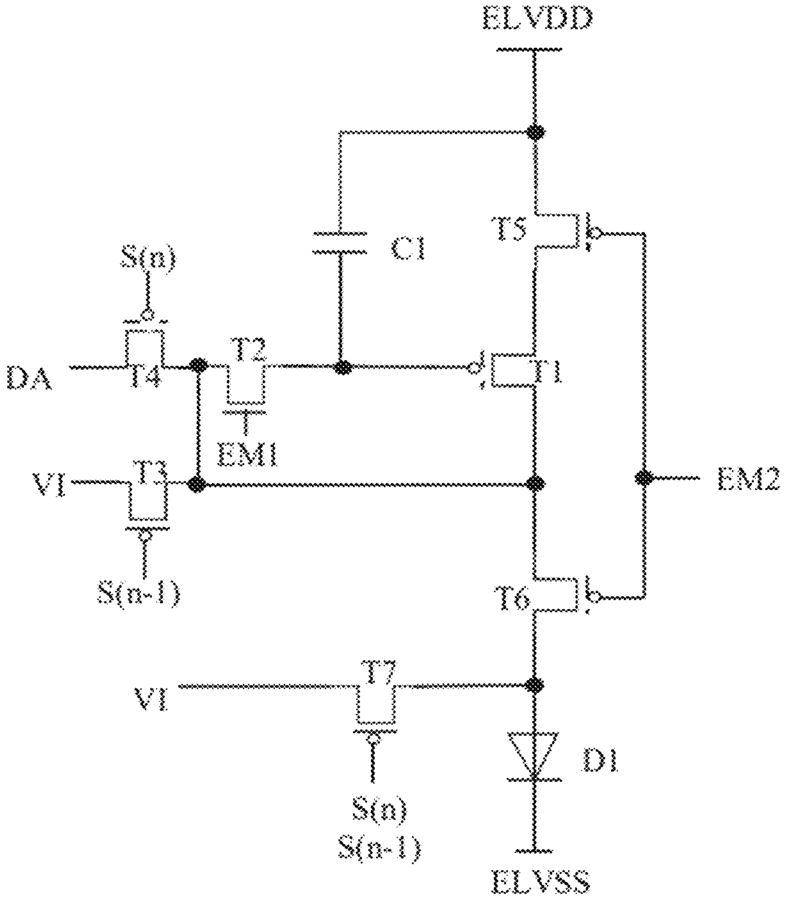

FIG. 4 is a schematic diagram of a display panel according to an embodiment of the present disclosure. FIGS. 5A to 5D are circuit diagrams of a pixel driving circuit according to an embodiment of the present disclosure. The display panel includes a display area 100*a* and a non-display area 100*b*. The display panel includes a plurality of light-emitting devices D1, a plurality of pixel driving circuits 101, a plurality of stages of gate driving circuits 102, and a plurality of light signal controlling circuits 103.

Optionally, the display panel includes a self-luminous display panel, a passive luminous display panel, a quantum dot display panel, and the like. When the display panel is a passive light-emitting display panel, the display panel includes a light-emitting source. Further, the light-emitting source may be the light-emitting element D1.

A plurality of the light-emitting devices D1 are located in the display area 100*a*. The gate driving circuits 102 are used to provide scanning signals. The gate driving circuits 102 are coupled to a plurality of the pixel driving circuits 101 through a plurality of scan signal lines SL. The light signal controlling circuits 103 are configured to provide a plurality of light controlling signals, and the plurality of light signal controlling circuits 103 are connected to the plurality of pixel driving circuits 101 through a plurality of light controlling signal lines EM.

Each of the pixel driving circuits 101 is used to drive the corresponding light-emitting element D1 to emit light. Each of the pixel driving circuits 101 includes a driving transistor T1 and a switching transistor T2 whose active layer is made of an oxide semiconductor. The switching transistor T2 is used for resetting the gate voltage of the driving transistor T1 according to the corresponding light controlling signal and for compensating the threshold voltage of the driving transistor Td by using the data signal Vdata. Uneven light emission of the light-emitting element D1 caused by the unstable gate voltage of the driving transistor T1 is improved due to the low leakage characteristics of the switching transistor T2, reducing power consumption of the display panel. Accordingly, the present disclosure is beneficial to improve the display quality of the display panel operated in the low-frequency driving mode in which flickering phenomenon is easy to occur.

The first electrode of the switching transistor T2 is connected to the gate of the driving transistor T1, and the second electrode of the switching transistor T2 is connected to the first electrode of the driving transistor T1.

Further, each pixel driving circuit further includes an initialization transistor T3, a data transistor T4, a first light controlling transistor T5, a second light controlling transistor T6, a reset transistor T7, and a storage capacitor C1.

The initialization transistor T3 is used to transmit the initialization signal Vi to the switching transistor T2 according to the corresponding scan signal. The first electrode of the initialization transistor T3 is connected to the initialization voltage node VI, and the second electrode of the initialization transistor T3 is connected to the first electrode of the switching transistor T2 and the first electrode of the driving transistor T1. Optionally, the active layer of the initialization transistor T3 is made of silicon semiconductor or oxide semiconductor. Further, the active layer of the initialization transistor T3 is made of silicon semiconductor. Optionally, the initialization signal Vi applied on the initialization voltage node VI is a signal that continuously rises or falls when the light-emitting element D1 is in a light-emitting state, so that the switching transistor T2 and the initialization transistor T3 dynamically compensates the gate voltage of the driving transistor T1, thereby improving the display quality of the display panel.

The data transistor T4 is used to transmit the data signal Vdata to the switching transistor T2 according to the corresponding scan signal. The first electrode of the data transistor T4 is connected to the data voltage node DA, and the second electrode of the data transistor T4 is connected to the first electrode of the driving transistor T1.

The first light controlling transistor T5 and the second light controlling transistor T6, in response to the corresponding light-emitting control signal, are controlled to cause the driving transistor T1 to generate a driving current for driving the light-emitting element D1 to emit light. Specifically, the first electrode of the first light controlling transistor T5 is connected to the first voltage node ELVDD, and the second electrode of the first light controlling transistor T5 is connected to the first electrode of the driving transistor T1. The first electrode of the second light controlling transistor T6 is connected to the second electrode of the driving transistor T1, and the second electrode of the second light controlling transistor T6 is connected to the anode of the light-emitting element D1.

The reset transistor T7 is used to reset the voltage applied on the anode of the light-emitting element D1 according to the corresponding scan signal. Specifically, the first electrode of the reset transistor T7 is connected to the initialization voltage node VI and the first electrode of the switching transistor T2. The second electrode of the reset transistor T7 is connected to the anode of the light-emitting element D1.

The storage capacitor C1 is used to maintain the gate voltage of the driving transistor T1. The storage capacitor C1 is connected between the first voltage node ELVDD and the gate of the driving transistor T1.

The cathode of the light-emitting element D1 is connected to the second voltage node ELVSS.

Please refer to FIGS. 4 and 5A to 5D, the plurality of light controlling signal lines EM include a first light controlling signal line EM1 and a second light controlling signal line EM2. The first light controlling signal line EM1 is configured to supply a first light controlling signal Em1 to the switching transistor T2. The first light controlling signal line EM1 or the second light controlling signal line EM2 is configured to supply the second light controlling signal Em2 to the first light controlling transistor T5 and the light controlling transistor T6. That is, the gate of the switching transistor T2 is connected to the first light controlling signal line EM1. The gate of the first light controlling transistor T5 and the gate of the second light controlling transistor T6 are connected to the first light controlling signal line EM1 or the second light controlling signal line EM2.

Further, the gate of the switching transistor T2, the gate of the first light controlling transistor T5, and the gate of the second light controlling transistor T6 are all connected to the first light controlling signal line EM1. The switching transistor T2 is an N-type transistor, and the first light controlling transistor T5 and the second light controlling transistor T6 are P-type transistors to prevent the switching transistor T2 from affecting the light-emitting state of the light-emitting element D1.

The plurality of scan signal lines SL include a first scan signal line S(n−1) and a second scan signal line S(n). The first scan signal line S(n−1) is configured to provide the first scan signal Scan(n−1) to the initialization transistor T3, and the second scan signal line S(n) is configured to provide a second scan signal Scan(n) to the data transistor T4. That is, the gate of the initialization transistor T3 is connected to the first scan signal line S(n−1), and the gate of the data transistor T4 is connected to the second scan signal line S(n). Optionally, the gate of the reset transistor T7 is connected to the first scan signal line S(n−1) or the second scan signal line S(n).

Optionally, the driving transistor T1, the switching transistor T2, the initialization transistor T3, the data transistor T4, the first light controlling transistor T5, the second light controlling transistor T6, and the reset transistor T7 include N-type transistors and/or P-type transistors.

An embodiment of the present disclosure also provides a display device, which includes any one of the above-mentioned pixel driving circuits and any one of the above-mentioned display panels.

Optionally, the display device further includes sensors, touch electrodes and other devices.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A pixel driving circuit, comprising:
- a light-emitting element;
- a driving transistor connected between a first voltage end and the light-emitting element, wherein the driving transistor is used for driving the light-emitting element to emit light;
- a switching transistor connected between a gate of the driving transistor and an initialization voltage node, and connected to a source or a drain of the driving transistor;
- a light controlling transistor connected in series with the driving transistor;
- a data transistor connected between the driving transistor and a data voltage node; and
- an initialization transistor connected between the switching transistor and the initialization voltage node, wherein the initialization transistor is configured to, in response to a first scan signal, transmit an initialization signal to the source or the drain of the driving transistor, and transmit the initialization signal to the gate of the driving transistor through the switching transistor;
- wherein upon both the switching transistor and the initialization transistor being turned on, or upon both the switching transistor and the data transistor being turned on, the initialization signal applied on the initialization voltage node is a constant signal.

2. The pixel driving circuit of claim 1, wherein the switching transistor conducts, in response to a first light-emitting control signal, the initialization signal, or a data signal to the gate of the driving transistor, so that a gate voltage or a threshold voltage of the switching transistor are initialized.

3. The pixel driving circuit of claim 1, wherein upon the driving transistor driving the light-emitting element to emit light, the initialization signal applied on the initialization voltage node is a voltage-rising signal or a voltage-falling signal.

4. The pixel driving circuit of claim 1, wherein a gate of the switching transistor and a gate of the light controlling transistor are both connected to a light controlling signal line.

5. The pixel driving circuit of claim 1, wherein the light controlling transistor comprises a first light controlling transistor and a second light controlling transistor, the first light controlling transistor is connected between the driving transistor and a first voltage node, the second light controlling transistor is connected between the driving transistor and a second voltage node, and a gate of the first light controlling transistor and a gate of the second light controlling transistor are both connected to a light controlling signal line.

6. The pixel driving circuit of claim 5, wherein in a case that timings of a first light controlling signal and a second light controlling signal are the same, the first light controlling transistor, the second light controlling transistor, and the switching transistor are all connected to the same light controlling signal line.

7. The pixel driving circuit of claim 1, further comprising a reset transistor, wherein the reset transistor is coupled between the initialization voltage node and the light-emitting element, and a gate of the reset transistor couples to a first scanning line or a second scanning line; or wherein the reset transistor is coupled between the initialization transistor and the light-emitting element, and the gate of the reset transistor couples to the first scanning line.

8. A display panel comprising:

a plurality of pixel driving circuits according to claim 1.

9. The display panel of claim 8, wherein the switching transistor conducts, in response to a first light-emitting control signal, the initialization signal, or a data signal to the gate of the driving transistor, so that a gate voltage or a threshold voltage of the switching transistor are initialized.

10. The display panel of claim 8, wherein upon the driving transistor driving the light-emitting element to emit light, the initialization signal applied on the initialization voltage node is a voltage-rising signal or a voltage-falling signal.

11. The display panel of claim 8, wherein a gate of the switching transistor and a gate of the light controlling transistor are both connected to a light controlling signal line.

12. The display panel of claim 8, wherein the light controlling transistor comprises a first light controlling transistor and a second light controlling transistor, the first light controlling transistor is connected between the driving transistor and a first voltage node, the second light controlling transistor is connected between the driving transistor and a second voltage node, and a gate of the first light controlling transistor and a gate of the second light controlling transistor are both connected to a light controlling signal line.

13. The display panel of claim 12, wherein in a case that timings of a first light controlling signal and a second light controlling signal are the same, the first light controlling transistor, the second light controlling transistor, and the switching transistor are all connected to the same light controlling signal line.

14. The display panel of claim 8, further comprising a reset transistor, wherein the reset transistor is coupled between the initialization voltage node and the light-emitting element, and a gate of the reset transistor couples to a first scanning line or a second scanning line; or wherein the reset transistor is coupled between the initialization transistor and the light-emitting element, and the gate of the reset transistor couples to the first scanning line.

15. A pixel driving circuit, comprising:

a light-emitting element;

a driving transistor connected between a first voltage end and the light-emitting element, wherein the driving transistor is used for driving the light-emitting element to emit light;

a switching transistor connected between a gate of the driving transistor and an initialization voltage node, and connected to a source or a drain of the driving transistor;

a light controlling transistor connected in series with the driving transistor;

a data transistor connected between the driving transistor and a data voltage node; and an initialization transistor connected between the switching transistor and the initialization voltage node, wherein the initialization transistor is configured to, in response to a first scan signal, transmit an initialization signal to the source or the drain of the driving transistor, and transmit the initialization signal to the gate of the driving transistor through the switching transistor;

wherein in response to a second scanning signal, the data transistor is used for conducting the data signal to the gate of the driving transistor via the switching transistor.

16. A display panel comprising:

a plurality of pixel driving circuits according to claim 15.

17. A pixel driving circuit, comprising:

a light-emitting element;

a driving transistor connected between a first voltage end and the light-emitting element, wherein the driving transistor is used for driving the light-emitting element to emit light;

a switching transistor connected between a gate of the driving transistor and an initialization voltage node, and connected to a source or a drain of the driving transistor;

a light controlling transistor connected in series with the driving transistor;

a data transistor connected between the driving transistor and a data voltage node; and an initialization transistor connected between the switching transistor and the initialization voltage node, wherein the initialization transistor is configured to, in response to a first scan signal, transmit an initialization signal to the source or the drain of the driving transistor, and transmit the initialization signal to the gate of the driving transistor through the switching transistor;

wherein an active layer of the initialization transistor is made of a silicon semiconductor, and a leakage current of the initialization transistor is greater than a leakage current of the switching transistor.

18. A display panel comprising:

a plurality of pixel driving circuits according to claim 17.

* * * * *